United States Patent Office 3,021,207
Patented Feb. 13, 1962

3,021,207
PROCESS FOR PRODUCING MIXED
AMMONIUM NITRATE
Leonard A. Stengel, Terre Haute, Ind., assignor to Commercial Solvents Corporation, Terre Haute, Ind., a corporation of Maryland
No Drawing. Filed Aug. 4, 1958, Ser. No. 753,133
7 Claims. (Cl. 71—64)

My invention relates to the production of mixed fertilizers, and more particularly, it relates to the production of mixed fertilizers in which substantially discrete, finely divided particles of a solid soil additive are uniformly embedded in a crystalline matrix of ammonium nitrate.

Because of the condition of the soil in many parts of the country, it is necessary to add various agents in addition to nitrogen-supplying fertilizers. It has heretofore been necessary to make separate applications to the soil, a time-consuming operation; or to make a loose mechanical mixture of the nitrogen-supplying fertilizer and other soil additive which is a difficult task, involving large quantities of material and special mixing equipment.

I have now discovered a process for preparing a mixed fertilizer containing ammonium nitrate as the nitrogen-containing fertilizer material and a solid soil additive, which mixture can be readily prepared at the time the ammonium nitrate is produced, thus resulting in a saving of equipment and labor at a later time as well as resulting in the production of a mixed fertilizer product which is uniform both in distribution of the components thereof and particle size of the end product regardless of the particle size of the additive material.

As indicated above, my new process results in the production of a mixed fertilizer containing ammonium nitrate and at least one additional material which may be a fertilizer such as, for example, ammonium sulfate; a liming agent such as, for example, calcium carbonate; a soil conditioner, such as, for example, gypsum. In this specification and the attached claims, I employ the term "soil additive" to include solid fertilizers, liming agents, soil conditioners and the like; or combinations thereof, which solid materials are suitable for combination with ammonium nitrate to prepare a so-called mixed ammonium nitrate fertilizer.

In carrying out my new process, I add the desired predetermined quantity of solid soil-additive to substantially anhydrous molten ammonium nitrate and then flow the fluid mixture of solid additive in molten ammonium nitrate onto a flat, moving endless belt to produce, on cooling, a solid sheet of the ammonium nitrate-soil additive mixture which is then comminuted to obtain the mixed fertilizer in any predetermined particle size. Soil additives which I can employ include ammonium sulfate, calcium carbonate, magnesium carbonate, gypsum, calcium sulfate, super or triple super phosphate, sodium nitrate, potassium nitrate and the like, or combinations of two or more of these materials. My soil additives may be up to about 30 mesh in particle size; however, I prefer to utilize additive materials having particle sizes of greater than about 60 mesh.

Because of the tendency of ammonium nitrate to decompose at or above its melting point, it has heretofore been considered too hazardous to utilize molten ammonium nitrate for the production of solid ammonium nitrate or mixed fertilizers containing solid ammonium nitrate. The hazard surrounding the use of molten ammonium nitrate has been amplified by the fact that the only processes available for producing molten ammonium nitrate necessarily required the provision of large amounts of ammonium nitrate in the molten state at any particular time. With my process for producing ammonium nitrate, described in U.S. Patent 2,568,901, however, molten ammonium nitrate can be continuously produced and continuously removed from the reactor as rapidly as it is produced in the molten state. Thus, no large volumes of molten ammonium nitrate are accumulated at any one time, but, at the same time, there is a continuous source of molten material. Furthermore, when the molten ammonium nitrate, obtained by the process of my above-identified patent, is contacted with an inert gas in a stripping zone filled with inert packing material substantially anhydrous molten ammonium nitrate can be continuously produced.

In carrying out my invention, I mix the finely divided solid soil additive with substantially anhydrous molten ammonium nitrate in any suitable mixing apparatus at a temperature at which the resultant mixture will remain fluid and then flow the fluid mixture of solid additive in molten ammonium nitrate onto a moving, flat endless metal belt to solidify the same by cooling after which it can be comminuted to any desired particle size. I prefer to continuously produce substantially anhydrous molten ammonium nitrate by my above-described method, collect the same in an agitated mixing pot to which the desired proportion of soil-additive is then added, mixed, and the mixture then flowed to the flat, moving, endless belt.

The liquid mix of solid soil additive and molten ammonium nitrate remains fluid for such a short period of time, about one minute, after being flowed onto a cooling belt that there is substantially no settling of the solid additive. This results in a final product which has essentially discrete particles of solid additive uniformly embedded in a matrix of ammonium nitrate. Where the solid soil additive is soluble in the ammonium nitrate, for example, sodium nitrate or potassium nitrate, or where the additive contains reactive materials, for example the free phosphoric acid in super phosphate and triple super phosphate, there may be a slight mixing of the substances. However, the particles remain as essentially discrete solid entities.

As indicated, the mixture of molten ammonium nitrate and soil additive must be prepared and maintained at a temperautre at which the particular mixture employed remains in a freely flowing fluid state. Obviously, the temperature must be above the melting point of ammonium nitrate, which for the pure compound is about 337° F. Upon addition of the solid soil-additive, the temperature at which the mixture remains fluid is substantially above the melting point for pure ammonium nitrate. For example, an equimolar mixture of ammonium nitrate and ammonium sulfate, while still fluid at 350° F., is a very thick and slowly running fluid which I have found inconvenient to process as far as flowing of the mixture onto the flat, moving, endless belt is concerned. Consequently, for this particular mixture, I prefer to maintain the mixture at a temperature of at least about 370° F. For mixtures of ammonium nitrate and ammonium sulfate of proportions other than equimolar, the temperatures at which the mixtures have the desired freely flowing fluidity would obviously vary. When 40% by weight limestone is employed as the soil additive, the mixture is satisfactorily fluid at a temperature as low as about 350° F., but temperatures below about 350° F. are undesirable. Similarly, the desired temperature for a freely flowing mixture would vary, depending on the particular ratio of components employed.

In connection with the preparation of the molten ammonium nitrate-soil additive mix, cooling of the molten ammonium nitrate takes place upon addition of the soil-additive thereto at room temperature. Consequently, in order to avoid the necessity of excessively high temperatures for the molten ammonium nitrate prior to addition of the soil-additive and in order to prevent subsequent undesirable thickening of the fluid mixture I prefer to preheat the soil-additive so that the amount of cooling of the molten ammonium nitrate upon mixture of the soil-additive therein is lessened. The temperature of the molten ammonium nitrate prior to mixing with the soil-additive can then be correspondingly lowered. Thus, for example, I have found in connection with an equimolar mixture of ammonium nitrate and ammonium sulfate that if the ammonium sulfate is preheated to a temperature of about 270° F. and continuously mixed in equimolar proportions with molten ammonium nitrate at a temperature of about 400° F., the resultant mixture will have a temperature of about 370° F. and can be satisfactorily flowed at that temperature to the flat, moving, endless belt for solidification.

Following mixing of the molten ammonium nitrate and soil-additive, I then flow the mixture onto a flat, moving, endless belt for solidification. The flat, moving belt can be of any suitable, corrosion-resistant material such as, for example, Teflon, a suitable metal, etc. I prefer to employ a stainless steel belt. Merely flowing my molten ammonium nitrate-soil additive mixture onto the flat, moving belt at ordinary room temperature is sufficient to cause solidification of the mixture prior to discharge from the belt. However, the sheet formed on the moving belt is pliable and somewhat sticky if the temperature of the sheet is above about 200° F. Consequently, I prefer to effect cooling of the sheet to a temperature below about 200° F. to solidify it in order to facilitate subsequent comminution, which operation is considerably hampered if the sheet is pliable and sticky when comminuted. The sheet of ammonium nitrate-soil additive can be cooled by any suitable means, such as, for example, by employing a cooling medium such as air flowing over the sheet on the flat, moving belt or employing cooling water in contact with the underside of the moving belt or merely allowing the ammonium nitrate-soil additive mixture to solidify and cool under atmospheric conditions, which latter means would require a considerably longer flat, moving belt than would be required when a cooling medium is employed.

The thickness of the sheet of solid ammonium nitrate-soil additive on the flat, moving belt can be controlled by varying the rate of flow of the molten mixture onto the belt and by varying the speed at which the belt is moved. Control of the width of the sheet produced can be facilitated by the use of an edge on the flat, moving belt which also provides for a sheet of uniform thickness from edge to edge. It is, of course, advantageous to produce a sheet of solid ammonium nitrate-soil additive with a thickness equivalent to the desired particle thickness after comminution of the sheet, which feature reduces the comminution necessary to produce a product of the desired particle size.

The amount of equipment needed to comminute a sheet of solid ammonium nitrate-soil additive with a thickness equivalent to the described particle thickness is maintained at a minimum in that the crystals form generally perpendicular to the cooling surface, except where they must form around a particle of soil additive. As the ammonium nitrate-soil additive crystals are generally perpendicular to the cooling surface the sheet is easily broken at the crystal interfaces and minimum comminution is required to obtain desired particle sizes.

Following production of the flat sheet of solid ammonium nitrate-soil additive, I then comminute the solid mixture to any desired particle size. The comminution can be effected by use of any of the conventional devices for reducing the size of solid materials such as, for example, a hammer mill, a roller mill, a device with rotating blades having a knife edge providing a shearing action, a device having paddle wheel blades to provide a crushing action, etc. A preferred device is one having a screened outlet so that the product is reduced to a size below any desired maximum, particles which will not pass through the screen being further comminuted to produce particles of a size which will pass through the screen. The product is then preferably further screened to remove fines which can be returned to the mixing vessel for mixture with the molten ammonium nitrate and soil additive.

The following examples are offered to illustrate my invention; however, I do not intend to be limited to the specific materials, proportions, or procedures described. Rather I intend to include within the scope of my invention all equivalents obvious to those skilled in the art.

*Example I*

Molten ammonium nitrate containing 0.14% moisture was produced at the rate of 123 pounds per hour according to the process described in U.S. Patent 2,568,901. Dolomitic limestone containing over 50% calcium carbonate and over 40% magnesium carbonate and a screen analysis of 25% −20 +200 mesh and 75% −200 mesh was introduced into the molten ammonium nitrate at a temperature of about 70° F. and at a rate of about 85 pounds per hour. The temperature of the ammonium nitrate-limestone mix in the mixing vessel was 378° F. The molten ammonium nitrate-limestone mix was flowed onto a flat, stainless steel endless belt moving at the rate of 8.18 feet per minute over an effective length of 17 feet, the belt being 20 inches wide. The mixture was flowed onto the moving belt at the rate of 208 pounds per hour. Water was circulated in contact with the underside of the flat, moving belt in a bed extending under the belt. The molten ammonium nitrate-limestone mix solidified on the belt into a sheet which was run off the end of the belt into a comminuter from which the product was obtained as small, solid, discrete particles. The product contained 59.3% ammonium nitrate, 40.3% limestone, 20.8% total nitrogen, and 0.1% moisture, the figures being percent by weight.

*Example II*

Molten ammonium nitrate containing 0.22% moisture, produced as described in Example I, was flowed at the rate of 121 pounds per hour at a temperature of 420° F. to a mixing vessel where it was mixed with 196 pounds per hour of ammonium sulfate, having the following screen analysis:

29.1% +30 mesh
66.6% −30 +100 mesh
3.4% −100 +200 mesh
0.7% −200 +325 mesh
0.2% −325 mesh The additive was preheated to a temperature of 272° F. The temperature of the mixture in the mixing vessel was 370° F. The mixture was flowed to a flat, moving stainless steel, endless belt at the rate of 317 pounds per hour as described in Example I. The product contained 39.0% ammonium nitrate, 60.9% ammonium sulfate, 27.0% total nitrogen, and 0.1% moisture, the figures being in percent by weight.

*Example III*

Molten ammonium nitrate containing 0.09% moisture and produced as described in Example I was flowed at a temperature of 434° F. and at a rate of 121.3 pounds per hour to a mixing vessel where it was mixed with 93.7 pounds per hour of gypsum, having the following screen analysis:

0.1% −100 +200 mesh
2.9% −200 +325 mesh
97% −325 mesh

The gypsum was preheated to a temperature of about 60° F. The temperature of the molten ammonium nitrate-gypsum mixture in the mixing vessel was 391° F. The mixture was flowed onto a flat, moving, stainless steel, endless belt as described in Example I at the rate of 215 pounds per hour where it was solidified, then comminuted to obtain a product containing 54.9% ammonium nitrate, 45.0% gypsum, 19.2% total nitrogen, and 0.1% moisture, the figures being in percent by weight and a particle size which would pass through a number 5 mesh and be retained on a number 26 mesh.

*Example IV*

The process of Examples I, II, and III was repeated using instead of calcium carbonate, magnesium carbonate, ammonium sulfate, and gypsum, each of the compositions calcium sulfate, super and triple super phosphate, sodium nitrate, and potassium nitrate.

This application is a continuation-in-part of my U.S. patent application Serial No. 533,919, filed September 12, 1955, now abandoned.

Now having described my invention, what I claim is:

1. The process of making a mixed solid fertilizer product in the form of a crystalline matrix of solid ammonium nitrate in which substantially discrete particles of finely divided solid soil additive selected from the group consisting of calcium carbonate, magnesium carbonate, ammonium sulfate, calcium sulfate, sodium nitrate, super phosphate, triple super phosphate, potassium nitrate, limestone and their mixtures are imbedded therein which consists essentially of continuously producing substantially anhydrous molten ammonium nitrate with a temperature greater than 337° F., continuously and uniformly mixing it with a predetermined amount of finely divided substantially discrete particles of said solid soil additive at a temperature at which the resultant mixture will remain in a freely flowing condition, said solid soil additive having been preheated to prevent subsequent undesirable thickening of the resultant mixture, then flowing the fluid mixture of said solid additive in molten ammonium nitrate onto a moving flat endless cooling belt at a rate sufficient to cool and solidify the mixture before discharge from the belt as a mechanical mixture in the form of crystals without settling of the solid particles and with the particles uniformly imbedded therein and comminuting the crystalline mass to predetermined particle size.

2. The process of claim 1 wherein the solid soil additive is a mixture of calcium carbonate and magnesium carbonate.

3. The process of claim 1 wherein the solid soil additive is ammonium sulfate.

4. The process of claim 1 in which the solid soil additive is super phosphate.

5. The process of claim 1 wherein the solid soil additive is calcium sulfate.

6. The process of claim 1 wherein the solid soil additive is sodium nitrate.

7. The process of making a mixed solid fertilizer product in the form of a crystalline matrix of ammonium nitrate having uniformly imbedded therein discrete particles up to about 30 mesh in size of a solid additive selected from the group consisting of calcium carbonate, magnesium carbonate, ammonium sulfate, calcium sulfate, sodium nitrate, super phosphate, triple super phosphate, potassium nitrate, limestone and their mixtures, consisting essentially of continuously producing substantially anhydrous molten ammonium nitrate with a temperature greater than 337° F., continuously and uniformly mixing it with a predetermined amount of finely divided substantially discrete particles up to about 30 mesh in size of said soil additive at a temperature at which the resultant mixture will remain in a freely flowing condition, said solid soil additive having been preheated to prevent subsequent undesirable thickening of the resultant mixture flowing the mixture onto a moving flat endless cooling belt, cooling the molten mass in the form of a sheet at a rate sufficient to cause it to solidify, without settling of said solid particles, as a mechanical mixture in the form of crystals generally perpendicular to the surface of the sheet and having crystal lengths the full thickness of the sheet to provide a crystalline matrix of ammonium nitrate having uniformly imbedded therein discrete particles of said additive, and comminuting the sheet to form a desired product size.

References Cited in the file of this patent

UNITED STATES PATENTS

| | | |
|---|---|---|
| 1,263,363 | Bergve et al. | Apr. 23, 1918 |
| 2,041,088 | Pfirrmann | May 19, 1936 |
| 2,399,987 | Cordie et al. | May 7, 1946 |
| 2,773,753 | Stengel | Dec. 11, 1956 |
| 2,798,801 | Kieffer et al. | July 9, 1957 |